US 6,919,809 B2

(12) United States Patent
Blunn et al.

(10) Patent No.: US 6,919,809 B2
(45) Date of Patent: Jul. 19, 2005

(54) OPTIMIZATION OF BUILDING VENTILATION BY SYSTEM AND ZONE LEVEL ACTION

(75) Inventors: Brad M. Blunn, Onalaska, WI (US); Tedd P. Johnson, La Crosse, WI (US); Eugene R. Shedivy, Maple Grove, MN (US); James K. McKeever, Woodbury, MN (US); Chad A. Bjorklund, Maple Grove, MN (US); Dwight J. Watercott, Maple Grove, MN (US)

(73) Assignee: American Standard International Inc., New York, NY (US)

( * ) Notice: Subject to any disclaimer, the term of this patent is extended or adjusted under 35 U.S.C. 154(b) by 29 days.

(21) Appl. No.: 10/700,895

(22) Filed: Nov. 3, 2003

(65) Prior Publication Data

US 2005/0095978 A1     May 5, 2005

(51) Int. Cl.[7] ............................................. F24F 11/00
(52) U.S. Cl. ....................... 340/632; 340/532; 340/606; 454/229
(58) Field of Search ........................ 454/229; 340/632, 340/532, 606

(56) References Cited

U.S. PATENT DOCUMENTS

| | | |
|---|---|---|
| 4,086,781 A | 5/1978 | Brody et al. |
| 4,205,381 A | 5/1980 | Games et al. |
| 4,288,990 A | 9/1981 | Schulz |
| 4,294,404 A | 10/1981 | Gajjar |
| 4,407,185 A | 10/1983 | Haines et al. |
| 4,407,447 A | 10/1983 | Sayegh |
| 4,437,608 A | 3/1984 | Smith |
| 4,886,110 A | 12/1989 | Jackson |
| 5,267,897 A | 12/1993 | Drees |
| 5,276,630 A | 1/1994 | Baldwin et al. |
| 5,292,280 A | 3/1994 | Janu et al. |
| 5,394,934 A | 3/1995 | Rein et al. |
| 6,019,677 A * | 2/2000 | Demster ..................... 454/290 |
| 6,298,912 B1 | 10/2001 | Rayburn et al. |
| 6,369,716 B1 * | 4/2002 | Abbas et al. ................ 340/632 |
| 6,467,695 B1 * | 10/2002 | Riley et al. ................ 236/49.3 |
| 2003/0078677 A1 | 4/2003 | Hull et al. |

OTHER PUBLICATIONS

"Application of CO2-Based Demand Controlled Ventilation Using ASHRAE Standard 62: Optimizing Energy Use and Ventilation", TO-98-21-1.

Carrier "ComfortID System" brochure, 811-017, Dated 1999.

Carrier Product Specification, "VAV Fan Terminal Zone Controller" Part No. 33ZCFANTRM, Form 33ZC-1PS, Dated 1999.

Carrier Product Specification, "Single Duct Air Terminal Zone Controller" Part No. 33ZCVAVTRM, Form 33ZC-2PS, Dated 1999.

Carrier Corporate News, "Carrier Provides the First Affordable, 'Real Time', Control System with ComfortID", Dated Jun. 18.

(Continued)

Primary Examiner—Harold Joyce
(74) Attorney, Agent, or Firm—William J. Beres; William O'Driscoll (57) ABSTRACT

A method of selecting a ventilation control strategy from among a plurality of ventilation control strategies. The method comprises the steps of: determining if a $CO_2$ signal is present and valid; selecting a $CO_2$ based ventilation control strategy if the $CO_2$ signal is present and valid; selecting a second ventilation control strategy if the $CO_2$ signal is not present or is invalid; and operating using the selected strategy. The selection step occurs in a zone controller.

39 Claims, 3 Drawing Sheets

OTHER PUBLICATIONS

"Proven Energy Savings wtih DCV Retrofits", HPAC Engineering, Feb. 2001.

"Assessing CO2 Control in Retrofits", ASHRAE Journal, Dated Nov. 2002, pp. 34-43.

"Using CO2 for Demand-Controlled Ventilation", Trane Engineers Newsletter, vol. 31, No. 3, Dated Sep., 2002.

"Ventilation for Acceptable Indoor Air Quality", ASHRAE Standard 62-1999/ASHRAE Standard 62-2001.

Trane Product Catalog, VAV-PRC008-EN.

"UCM 4.0 amd Wireless VAV Communication", Trane Installation/Operator Programming, VAV-SVX01B-EN, Dated May 2001.

"Ventilating Single-Duct VAV Systems", Trane Engineers Newsletter, vol. 27, No. 1, Dated Jan. 1998.

"Designing an ASHRAE 62-Compliant Ventilation System", Trane Engineers Newsletter, vol. 24, No. 2, Dated 1995.

"Demand Control Ventilation, The Right Amount of Ventilation, at the Right Time and Place, for 20% Less", www.carriercompletesystems.com.

John J. Lauria, III, "How Demand Controlled Ventilation Increases Air Quality and Reduces Costs", Dated Dec. 1998.

"DCV: History, Theory, and Myths", Dated Feb. 1999.

* cited by examiner

OPTIMIZATION OF BUILDING VENTILATION BY SYSTEM AND ZONE LEVEL ACTION

BACKGROUND OF THE INVENTION

A popular dictionary defines "ventilation" as the admission of "fresh air . . . to replace stale or noxious air". In the context of a building, this means introducing outdoor air and circulating it throughout the building to dilute contaminants and odors. The amount of air needed for proper ventilation largely depends on the population of building. In most commercial applications, the number of people in the building seldom equals the design occupancy. As a result, at least some spaces in the building are over ventilated leading to correspondingly higher than necessary energy costs.

Static rate ventilation is a control strategy where a particular ventilation rate is set and the particular rate does not vary to meet changing conditions.

Various demand controlled ventilation strategies attempt to control ventilation based upon actual occupancy and reduce operating costs by optimizing or at least controlling the rate of outdoor air intake to something less than maximum capacity.

Demand controlled ventilation describes control strategies that respond to the actual demand (need) for ventilation by regulating the rate at which the HVAC system brings outdoor air into the building. There are several such strategies: occupancy sensors detecting the presence or number of people in each monitored zone; occupancy schedules which allow a building automation system to schedule the current population based on the time of day; and carbon dioxide sensors monitoring the concentration of carbon dioxide that the occupants continuously produce.

The practice of using carbon dioxide concentrations as an indicator of population or ventilation rate is often called $CO_2$ Based Demand Controlled Ventilation. A general description of such a strategy is described in "Using $CO_2$ for Demand Controlled Ventilation", Trane Engineering Newsletter, Volume 31, Number 3, published in September of 2002.

Previous systems select one of the aforementioned strategies and control ventilation for a building or space based upon the selected strategy. Problems in these systems occur when $CO_2$ or occupancy sensors fail or provide invalid signals or when occupancy schedules are not updated or entered correctly.

SUMMARY OF THE INVENTION

The present invention provides a more flexible ventilation strategy which preferably operates using the $CO_2$ Based Demand Controlled Ventilation, but will selectively operate using a dynamic rate strategy, an occupancy strategy or a static rate strategy should particular inputs be unavailable or invalid.

It is an object, feature and advantage of the present invention to provide a cohesive strategy for selecting building ventilation control strategy. A further object, feature and advantage of the present invention automatically selects and implements a second control strategy if a control element of the selected control strategy is unavailable or invalid. A still further object, feature and advantage of the present invention is that the selected strategy is reselected and implemented should the unavailable control element be repaired or recover and present a valid signal.

The present invention provides a method of selecting a ventilation control strategy from among a plurality of ventilation control strategies. The method comprises the steps of: determining if a $CO_2$ signal is present and valid; selecting a $CO_2$ based ventilation control strategy if the $CO_2$ signal is present and valid; selecting a second ventilation control strategy if the $CO_2$ signal is not present or is invalid; and operating using the selected strategy. The selection occurs in a zone controller.

The present invention also provides a method of coordinating operation in a building control system including a coordinating controller, a plurality of coordinated controllers, and a communications network operably connecting the coordinating controller to the plurality of coordinated controllers. The method comprises the steps of: maintaining database and system information in the coordinating controller; completing system control strategy calculations in the coordinating controller; disseminating information relative to system control strategies from the coordinating controller to the plurality of coordinated controllers; and determining in at least one of the plurality of coordinated controllers which of a selected group of control strategies to be implemented in that coordinated controller.

The present invention further provides a method of coordinating the operation of a building control system having a coordinating controller and a plurality of coordinated controllers. The method comprises the steps of: determining at least one system wide control strategy in the coordinating controller; forwarding elements of the system wide control strategy to one or more of a plurality of coordinated controllers; implementing one or more forwarded requirements of the system wide control strategy in at least one of the plurality of coordinating controllers; and overriding, in at least one of the plurality of coordinated controllers, at least one forwarded element of the system wide control strategy.

The present invention additionally provides a method of coordinating the operation of a building control system including a coordinating controller and a plurality of coordinated controllers. The method comprises the steps of: providing a plurality of coordinated controllers; providing a coordinating controller operably connected to and communicating with the plurality of coordinated controllers; determining a system wide control strategy in the coordinating controller; communicating elements of the system wide control strategy to the plurality of coordinated controllers; determining local requirements in at least one of the plurality of coordinated controllers; and overriding the normal control routines of the coordinating controller if said at least one of the plurality of coordinated controllers determines that local requirements will not be met by the system wide strategy.

The present invention still further provides a method of calculating an outside air requirement for a zone. The method comprises the steps of: determining that ventilation is on for the particular zone; verifying that a $CO_2$ signal is present and valid for the particular zone; controlling the airflow to the zone based on the $CO_2$ signal if the signal is present and valid; and controlling the airflow to the zone based on another criteria if the $CO_2$ signal is not present or is invalid.

The present invention yet further provides a method of meeting fresh air and temperature requirements in a zone. The method comprises the steps of: determining a zone temperature setpoint and absolute limit requirements; determining a zone fresh air requirement; determining the percentage of fresh air in a supply airstream; determining if the percentage of fresh air in the supply airstream is enough to meet the zone fresh air requirement; and increasing the amount of supply airstream flow admitted to the zone if the percentage of fresh air in the supply airstream is insufficient to meet the zone's fresh air requirement.

The present invention still further provides a method of configuring a zone controller. The method comprises the steps of: determining if a valid $CO_2$ measurement is available representative of $CO_2$ in a zone being controlled by the zone controller; operating using a $CO_2$ based ventilation control strategy if the $CO_2$ signal is available; and operating using a non-$CO_2$ based ventilation control strategy if the $CO_2$ signal is not available.

The present invention moreover provides a method of providing fresh air to a zone. The method comprises the steps of: determining a local setpoint relative to a zone controller; receiving, in the zone controller, a dynamic setpoint from a coordinating controller; selecting, in the zone controller, either the dynamic setpoint or the local setpoint; and controlling the fresh air provided to the zone in accordance with the selected setpoint.

The present invention will also switch fresh air requirements based on system and/or locally sensed occupancy.

DETAILED DESCRIPTION OF THE INVENTION

In the description which follows, like elements are marked throughout the specification and drawings with the same reference numerals, respectively. The drawing figures are not necessarily to scale, and flow diagrams or flow charts may show only essential steps of the improvements of the present invention. Conventional or ancillary operating steps may be omitted in the interest of clarity and conciseness. The letters Y and N in a flow chart mean "Yes" and "No" respectively.

Figure 1:
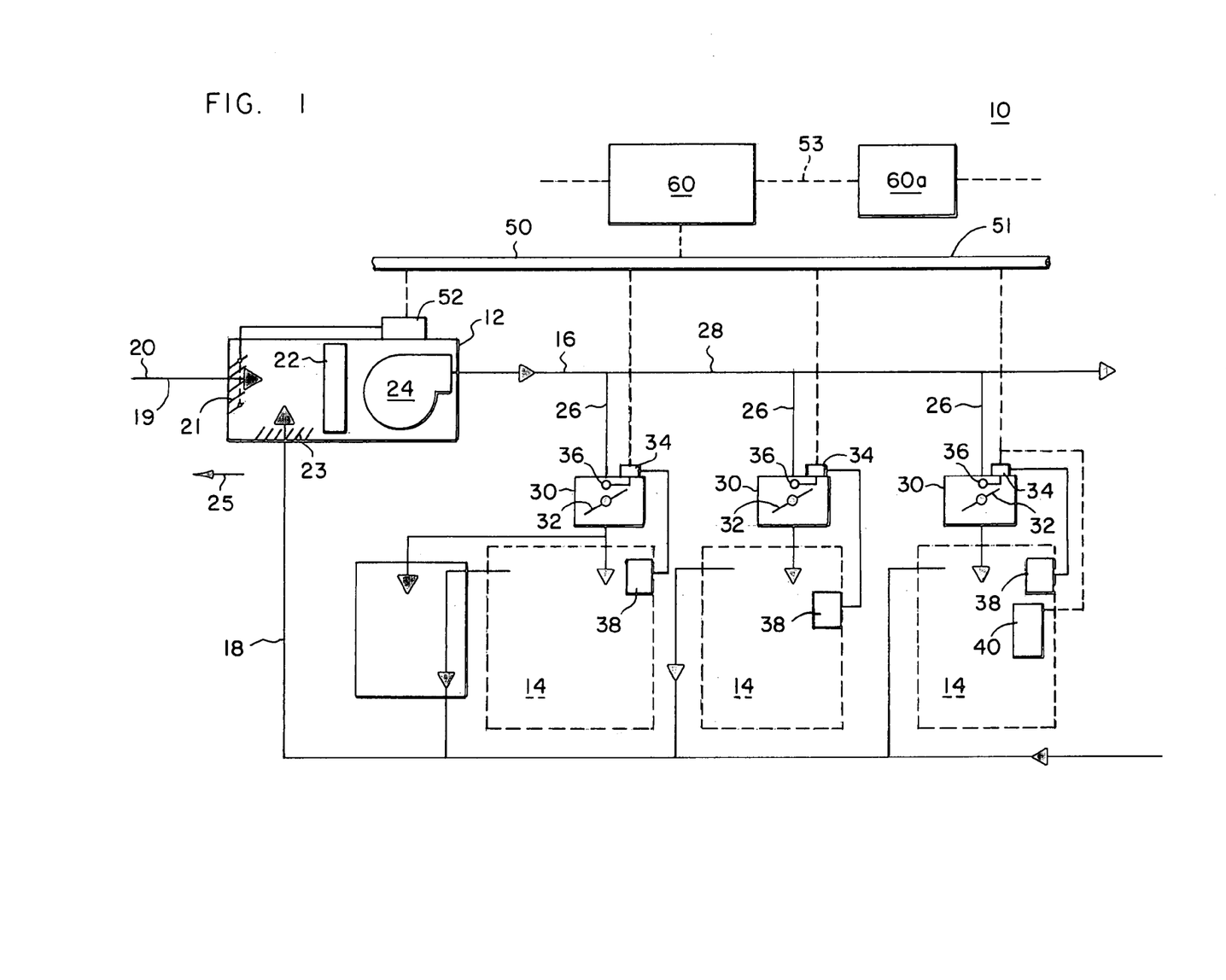
FIG. 1 is a schematic of an air conditioning system in accordance with the present invention.

Referring to FIG. 1, a typical heating, ventilating and air conditioning (HVAC) air delivery/conditioning system 10 comprises an air handling unit 12 delivering conditioned air to a plurality of zones 14 by means of supply air ductwork 16 and receiving return air from those same zones 14 by means of return air ductwork 18.

For purposes of this invention, an air handler 12 is any apparatus comprising an enclosure that includes at least one piece of air handling equipment such as a blower, a heat exchanger, a compressor, a filter, etc. Air handlers typically provide conditioned air to a comfort zone, such as a room or other designated area within a building. The conditioning of the air may include, but is not limited to heating, cooling, humidifying, dehumidifying, filtering, ventilating, and various combinations thereof. Typical air handlers are sold by Trane, a Division of American Standard Inc., under the trademarks Modular Climate Changer and Penthouse.

The air handler 12 receives outside air 20 from a conventional source of outside air, such as a duct 19 connected to ambient, and generates conditioned air from a coil 22 or other device for providing heating, dehumidifying, or cooling. Preferably, the air handler 12 includes an air moving device 24 such as a fan or blower, providing a motivating force to move the air through the supply air ductwork 16, the zones 14 and the return air ductwork 18. The air handler 12 includes an air handler controller 52 modulating the operation of either or both of the coil 22 and the air moving device 24.

An outside air damper 21, also connected to and under the control of the air handler controller 52, is preferably provided to control the amount of outside air 20 entering the system 10 through the outside air duct 19. A corresponding return air damper 23 and exhaust exit 25 may be provided under the control of the air handler controller 52 to control the amount of return air recirculated in the system versus the amount of return air exhausted from the system.

The supply air ductwork 16 typically includes branch ductwork 26 conveying conditioned air from a main supply air duct 28 to individual zones 14 or groups of zones 15 (collectively zone 14). Each zone 14 has an affiliated air control mechanism 30 including a damper 32 and an associated zone controller 34 operably connected to the respective damper 32 and modulating the position of the damper 32. Each zone controller 34 has a flow measurement sensor 36 providing a measure of the airflow through the air control mechanism 30. Typical air control mechanisms are sold by Trane, a Division of American Standard Inc., under the trademarks VariTrac and VariTrane.

Each zone controller 34 is also operably connected to at least one sensor 38 in the zone such that the sensor 38 provides a temperature measurement or control signal indicative of the temperature in the zone 14. The temperature or control signal is used by the zone controller 34 as a basis for modulating the position of the damper 32. A $CO_2$ sensor 40 located in the zone and provides a signal representative of measured $CO_2$ in the zone 14 to the zone controller 34 thereby enabling the zone controller 34 to modulate the damper 32 responsive thereto and maintain a minimum level of outside air. Suitable $CO_2$ sensors can be implemented as communicating sensors or non-communicating sensors, and a suitable communicating $CO_2$ sensor 40 may be obtained from Trane, a Division of American Standard Inc. Communicating sensors act as network peers to the zone controllers 34 on the local network 51, and local bindings (i.e. relational links) can be set up between a particular $CO_2$ sensor and one, many or all of the zone controllers 34 on the local network 51 so that those zone controllers 34 recognize and make use of the measured $CO_2$ signal provided by the particular $CO_2$ sensor 40. Alternatively, system level bindings (i.e. relationship links) may also be set up with such that a signal from the $CO_2$ sensor 40 must first be sent to the coordinating controller 60 which in turn forwards the signal to zone controllers 34 found or linked to that $CO_2$ sensor. In this alternative use of a communicating $CO_2$ sensor 40, if the coordinating controller 60 is not operable, the $CO_2$ signal is not provided to the related zone controllers 34. Finally, the $CO_2$ sensor 40 may also be implemented as a non-communicating sensor requiring a hardwired connection directly to a zone controller 34 or to any other device (not shown) on the local network 51 that can support a non-communicating $CO_2$ sensor input. The zone controller 34 or other device hardwired to the $CO_2$ sensor 40 can be bound (i.e. relationally linked) at either a local or a system level to one, many or all of the remaining zone controllers 34 so that the $CO_2$ sensor 40 will appear as if the hardwired $CO_2$ sensor were a communicating sensor.

A communications network 50 such as a bus, internet, Ethernet, wireless network, a COMM5 link, a BACnet network, an Echelon LonTalk network or the like is provided linking the air handler controller 52 with the various zone controllers 34 and to a coordinating controller 60. Although the network 50 is described as a single network, in the preferred embodiment the network 50 is implemented as a local network 51 linking the zone controllers 34 to a coordinating controller 60 and at least one air handler controller 52, and a coordinating network 53 linking multiple coordinating controller 60 together. Although shown in FIG. 1 as a star arrangement, the local network is preferably implemented as a daisy chained COMM5 link, and the coordinating network 53 is preferably implemented as a shared IP network on Ethernet media or as a private network on Ethernet or ARCnet media. The coordinating controller 60 integrates the operation of the overall system 10 so as to achieve maximum HVAC benefits at optimal cost. Coordinating controllers are sold the Trane, a Division of American Standard Inc., under the trademarks Tracker and Tracer Summit. Preferably, the coordinating controller maintains database and system information and completes system control strategy calculations for dissemination by the network 50 to the zone controller 34 and the air handler controller 52.

The $CO_2$ sensor 40 is preferably connected to the communications network 50 (and more preferably, to the local network 51) and provides the measured $CO_2$ signal to the coordinating controller 60, which in turn relays the measured $CO_2$ signal, or a signal representative thereof, to one or more zone controllers 34. Alternatively, the zone controller 34 could receive a signal representative of measured $CO_2$ from a $CO_2$ sensor 40 located in its zone 14 either directly from the network 50 or by a direct connection (not shown) between the zone controller 34 and the $CO_2$ sensor 40.

In operation, the air handler controller 52 adjusts the damper 21 to control the amount of outside air entering the system 10 from the outside air input 20, positions the return air damper 21 to control the amount of return air mixed with the outside air, conditions the temperature of the mixture of the outdoor air and the return air, and provides the conditioned air to the supply duct 16. The conditioned air is then directed by the main and branch ducts 26, 28 to the zones 14. The air control mechanisms 30 and their communicating zone controllers 34 controllably distribute the conditioned air to the individual zones 14. The communications network 50 links all of the controllers 34, 52, 60 on the system 10, and the coordinating controller 60 coordinates operation between the various controllers 34, 52.

Through the communications network 50, the coordinating controller 60 facilitates an optimal ventilation control strategy for the system 10 by coordinating the operation of the individual controllers 34, 52 and the coordinating controller 60, allowing a total system strategy.

In a typical previous system, a coordinating controller determines a system wide control strategy and each zone controller slavishly follows the system wide control strategy. In the present invention, the coordinating controller 60 implements a system wide control strategy but each zone controller 34 independently configures itself to one of two main ventilation control options: (a) a demand based ventilation control strategy, preferably using communicating $CO_2$ sensors 40, or (b) a static rate ventilation control strategy. If the demand based ventilation control strategy is selected, then a type of demand based ventilation control is further selected from $CO_2$ based, dynamic setpoint based, or occupancy based demand ventilation control. Each zone controller 34 reports its actions and its needs to the coordinating controller 60, which responds by adapting the system wide control strategy accordingly.

Figure 2:
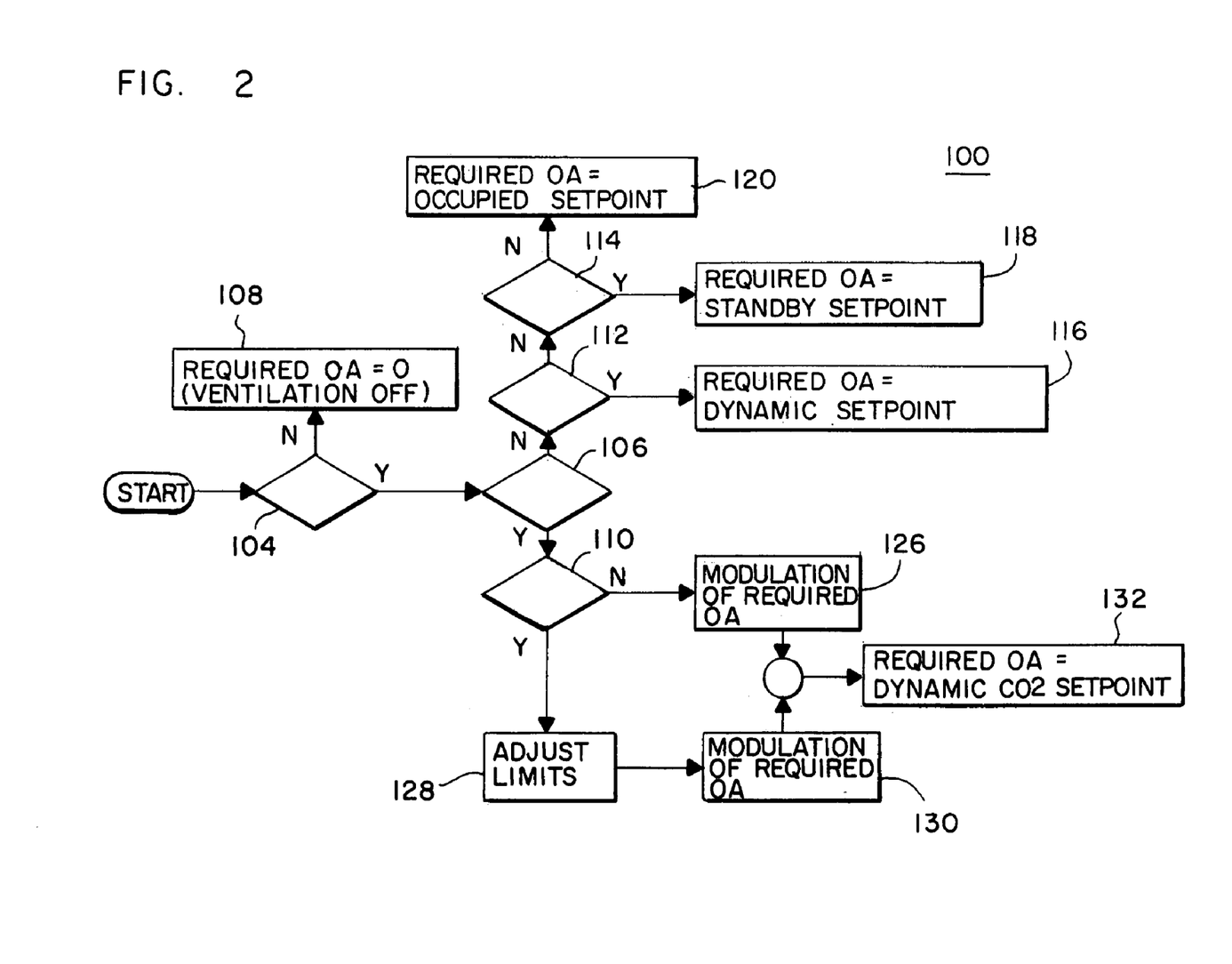
FIG. 2 is a flow diagram of determination of required outside air for local zone control by a zone controller.

FIG. 2 is a flow chart showing a zone controller's process in selecting a ventilation control strategy.

At the zone level 14, 15, there are four basic ventilation strategies supported by the zone controller 34. The four strategies are:
  Fixed ventilation (AKA static rate ventilation)
  Scheduled ventilation (a demand controlled ventilation strategy)
  Occupancy based ventilation (a demand controlled ventilation strategy)
  CO2 Based Demand Controlled Ventilation (a demand controlled ventilation strategy)

Fixed ventilation, also known as design ventilation, is based upon the design load of the space 14, 15. An engineer will often calculate the ventilation requirements of a space 14, 15 based upon the peak load in the space 14, 15. That is, if a space 14, 15 is designed to house 20 people, then the ventilation rate will be set based upon 20 people. At times of part load (i.e. there are only 15 people in the space instead of 20), the ventilation rate remains at design.

Scheduled ventilation is based upon knowing how many people are in zone 14 at any given time. Knowing what type of space the zone 14 serves and how much ventilation air each person in that zone 14 needs for that type of space allows a user or the coordinating controller 60 to calculate a ventilation rate. For example, Classroom 101 requires 20 CFM per person of ventilation air during occupied hours. During unoccupied hours, no ventilation is required in Classroom 101. Classroom 101 is scheduled to have one person in it from 8:00 to 9:00 AM, 21 people in it from 9:00 AM to 3:00 PM, and one person in it from 3:00 to 5:00 PM. The ventilation schedule for the VAV is as follows: 20 CFM from 8:00 to 9:00 AM, 420 CFM from 9:00 to 3:00 PM, and 20 CFM from 3:00 to 5:00 PM.

Occupancy based ventilation requires an occupancy sensor wired to the zone controller 34. During occupied hours, when occupancy is detected in the space (Occupied), the zone controller 34 will use the Occupied Ventilation setpoint. During occupied hours, when occupancy is not detected in the space (Occupied Standby), the zone controller 34 will use the Standby Ventilation setpoint.

Figures 3, 4:
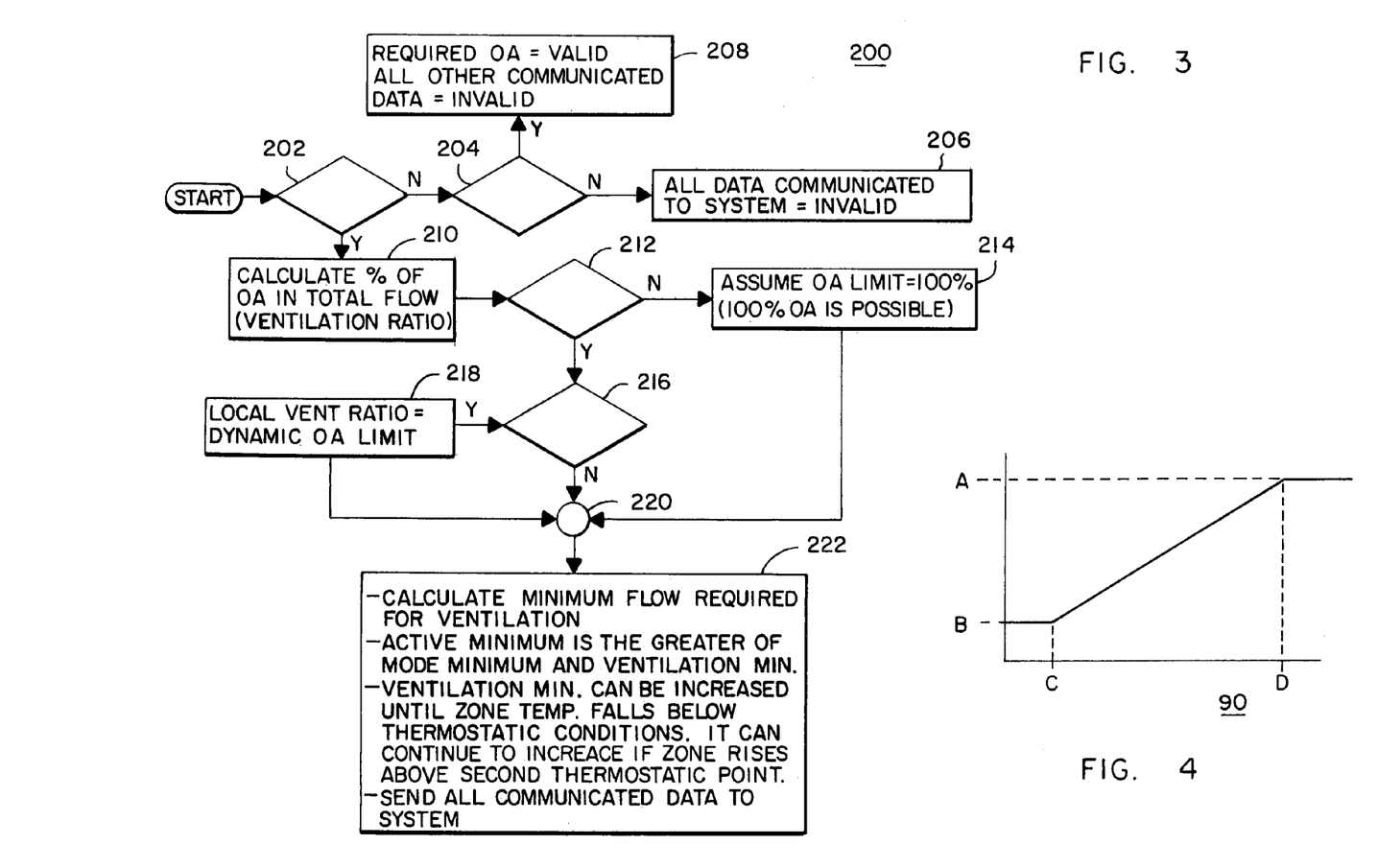
FIG. 3 is a flow chart of determination of local zone action by a zone controller.
FIG. 4 is a graph of a $CO_2$ based ventilation strategy.

As shown in graph 90 of FIG. 4, $CO_2$ based ventilation requires a $CO_2$ sensor 40. Based upon the $CO_2$ levels in the zone 14, 15, the ventilation setpoint is linearly modulated between the points (B, C) and (A, D) where:
  A=occupied ventilation setpoint
  B=standby ventilation setpoint
  C=$CO_2$ low limit
  D=$CO_2$ high limit Using the $CO_2$ based ventilation control strategy, the zone controller 34 determines the outdoor air requirement for the zone 14 that the zone controller 34 serves based on a $CO_2$ reading from that zone 14 as provided the sensor 40. If no ventilation requirements are in effect, the required outside air is set to zero at step 108.

If the ventilation requirements are being enforced, i.e. are active or in effect, the zone controller 34 receives the $CO_2$ reading from the sensor 40 associated with the zone 14 that the zone controller 34 serves and verifies that the $CO_2$ reading is valid and in range. This verification occurs at step 106. If the $CO_2$ sensor 40 has failed or the signal from that $CO_2$ sensor 40 is invalid, the zone controller 34 reverts to a secondary ventilation control strategy, such as the static rate ventilation control strategy, until a valid $CO_2$ reading is available from the $CO_2$ sensor 40. This allows ventilation to be maintained during a failure of the $CO_2$ sensor 40.

The zone controller 34 has the capability of receiving a dynamic setpoint from the coordinating controller 60, this particularly occurring when implementing a scheduled ventilation control strategy. The dynamic setpoint is calculated by the coordinating controller 60 based on the coordinating controller's knowledge of actual, rather than theoretical, conditions in the zone 14. Those conditions include meeting or occupancy schedules programmed by a user, and current information regarding the number of occupants actually present in a particular zone 14. If such a dynamic setpoint is present, the zone controller 34 verifies that the dynamic setpoint is valid and implements the use of the dynamic setpoint if it is valid and present. If the dynamic setpoint is not available or is invalid, the local setpoint value provided by the zone controller 34 configured values or other input is used in place of the dynamic setpoint.

The dynamic setpoint is sent from the coordinating controller 60 to the zone controllers 34 by means of the local network 51. This dynamic setpoint can be either a scheduled setpoint, or potentially a $CO_2$-based setpoint, and represents calculations made in the coordinating controller 60 based on user supplied usage schedules. For example, a zone sized for 20 people may only have 8 people present for a meeting. Instead of supplying 20 CFM for each of 20 potential people to meet a 400 CFM potential setpoint, the coordinating controller 60 may calculate a dynamic setpoint of 160 CFM by multiplying the 8 people present times the 20 CFM that each of those people needs.

If the $CO_2$ signal is present and valid, the outdoor air requirement for the zone 14 is derived from a linear modulation equation that operates between the minimum and maximum outside air values based upon the $CO_2$ reading from the $CO_2$ sensor 40. Minimum and maximum $CO_2$ values are stored in the zone controller 34 and are used to limit the value of the input from the $CO_2$ sensor to a known range. When the reading from the $CO_2$ sensor 34 for the zone 14 is above the high $CO_2$ limit, the outdoor air requirement will be set as the maximum allowed value, e.g. the high $CO_2$ limit. Likewise, when the $CO_2$ reading from the $CO_2$ sensor 40 is below the low $CO_2$ limit for the $CO_2$ sensor 40, the outside air requirement will be set as the minimum allowed value, e.g. the low $CO_2$ limit. If the $CO_2$ reading from the $CO_2$ sensor 40 is between the minimum and maximum $CO_2$ limits, linear interpolation is used to determine the outside air requirement for the zone 14.

Specifically referencing FIG. 2, the individual zone controller 34 determination of required outdoor air needed in its zone 14 is laid out in the flow chart 100. At step 104, a determination is made as to whether or not ventilation is being enforced (i.e. ventilation is set on). If ventilation is not being enforced (i.e. ventilation is set off), step 108 is executed where the required outside air for that zone 14 is set to be zero.

If step 104 determined that ventilation was on, then a determination is made at step 106 to verify that an input signal is being received from the $CO_2$ sensor 40 and that such a signal is valid. If the signal from the $CO_2$ sensor 40 is not valid, then $CO_2$ based control strategy cannot be presently implemented and step 112 is executed to determine what alternative strategy should be used.

At step 112, a determination is made as to whether a dynamic setpoint from the coordinating controller 60 is both present and valid. If the dynamic setpoint is both present and valid, then a dynamic input control strategy can be implemented at step 116. If so, step 116 is executed and the required outdoor air is set at the dynamic setpoint received in the zone controller 34 from the coordinating controller 60.

However, if at step 112 the dynamic setpoint was not present or was invalid, then a dynamic input control strategy cannot be implemented and step 114 is pursued to determine which occupancy based strategy to use. A determination is made at step 114 as to whether the zone 14 is in an occupied or standby status. If the zone 14 has been set by a user or a scheduler program to standby status, then a standby control strategy is followed and the required outdoor air is set to a standby setpoint at step 118. If the zone has been set by a user or a scheduler program to be in an occupied status, then an occupied control strategy is followed and the required outdoor air is set to an occupied setpoint at step 120. The occupied setpoint and the standby setpoint are initially set, by a download of information from the coordinating controller 60, or by use of a portable programming device. A suitable portable programming device is available from Trane, a Division of American Standard Inc., under the trademark Rover.

If step 106 determined that the $CO_2$ signal from the $CO_2$ sensor 40 was both present and valid, then a $CO_2$ based control strategy can be implemented and step 110 is executed. At step 110 the dynamic setpoint is determined to be present and valid. If the dynamic rate input is present and valid, then the limits (A of FIG. 4) are then adjusted at step 128 to ensure that those limits do not exceed the absolute limits (the new A cannot be larger than the old A or smaller than B of FIG. 4) and the zone controller 34 modulates the outdoor air setpoint as required as indicated by step 130.

Should step 110 have determined that a dynamic setpoint was either not present or invalid, then the zone controller 34 modulates the damper 32 outdoor air setpoint at step 126.

In either case of step 126 and 130, the next step executed is step 132 where the required outside air setpoint is set equal to the dynamic $CO_2$ setpoint.

If a $CO_2$ signal is not present, if a $CO_2$ signal is temporarily invalid, or if the user has set the control strategy for the zone controller 34 as the static rate ventilation, then a secondary ventilation strategy, such as the static rate ventilation strategy, is used.

In a fixed rate ventilation, a discrete outside air requirement for the zone 14 is derived from any of the zone controller's occupancy state, a scheduled input to the zone controller or a fixed rate. The outdoor air values for the outdoor air requirement, regardless of the ventilation strategy used, are obtained from ASHRAE Standard 62-2001 Ventilation for Acceptable Indoor Air Quality based upon the type of activity in the zone 14, the area of zone 14, and the estimated occupancy of the zone 14. The outdoor air requirements are preferably stored in the zone controller 34, but may also be communicated to the coordinating controller 60 for storage and subsequent downloading.

Once a zone controller 34 has determined the outside air requirements for its associated zone or zones 14, the zone controller 34 determines a unique ventilation ratio using ASHRAE Standard 62-2001 Ventilation for Acceptable Indoor Air Quality. This is subsequently detailed with regard to FIG. 3. The zone controller 34 reads the value of a dynamic ventilation ratio limit from the bus 50 if it is available. If the dynamic ventilation ratio limit is either unavailable or invalid, the zone controller 34 sets the dynamic ventilation ratio limit to be 100%, thereby assuming that all supply air can be comprised of outside air. If the dynamic ventilation ratio limit is valid, the zone controller 34 compares its local ventilation ratio against the dynamic ventilation ratio limit. If the local ventilation ratio is larger than the dynamic ventilation ratio limit, then the local ventilation ratio is set to the limit; otherwise, the local ratio is left unchanged.

After the zone controller 34 completes its ventilation calculations, the zone controller 34 sends the results of those calculations to the coordinating controller 60 via the local network 51. The coordinating controller 60 then coordinates the operation of the system 10 to provide proper ventilation for each of the individual zones 14 by establishing the amount of outside air 20 introduced into the system 10. I.E. the coordinating controller 60 tells the air handler controller 62 the minimum amount of ventilation air to bring in. Typically the damper 21 under control of the air handler controller 52 is provided to accomplish this purpose. The percentage of outside air introduced into the system 10 is calculated using equation 6.1 from ASHRAE Standard 62-2001. From this calculated percentage, an outdoor airflow setpoint can be derived for the air handler 12. Under most conditions, the air handler 12 will supply sufficient outside air or will adjust its outside air damper position 21 to meet the outside air setpoint.

In FIG. 3, each zone controller 34 sends its ventilation ratio data and its required outside air data, as well as other information such as its minimum flow setpoint, and its minimum setpoint source to the coordinating controller 60 by means of the network 50. The coordinating controller periodically calculates and sends a dynamic ventilation ratio limit to the various zone controllers 34.

FIG. 3 shows how any particular zone controller 34 determines its local zone action using a flow chart 200.

Initially, the airflow reading from the airflow sensor 36 is determined to be valid at step 202. If the airflow reading from the airflow sensor 36 is determined to be invalid at step 202, then step 204 is executed. At step 204 the amount of required outside air provided by the coordinating controller 60 over the network 50 is examined for validity. If the required outside air is invalid, such as might occur when it was outside its predetermined upper or lower limits, then step 206 is implemented and all data communicated to the zone controller is determined to be invalid. If the required outside air from the coordinating controller was determined to be valid at step 204, then at step 208 the required outside air is set to be valid but all other communicated data is treated as invalid.

If step 202 determined that the flow reading from the flow sensor 36 was valid, then step 210 is executed.

At step 210, a portion of equation 6.1 from ASHRAE Standard 62-2001 is used to calculate the percentage of outside air in the total flow measured by the flow sensor 36.

The ventilation optimization program in the coordinating controller 60 calculates the amount of ventilation (fresh air) the air handler 12 needs to deliver to the system by using equation 6-1 as defined in ASHRAE 62-2001.

$$Y = X/[1+x-z] \quad \text{Equation 6-1}$$

The coordinating controller 60 has an objective to calculate $V_{ot}$, where $V_{ot} = Y \times V_{st}$ $V_{ot}$=corrected total outdoor airflow rate for the outside air 20

$V_{st}$=total supply flow rate, i.e. the sum of all supply air for all ductwork 26, 28 of the system 10

$Y = V_{ot}/V_{st}$=corrected fraction of outdoor air 20 in the system supply $= X/[1+X-Z]$ $X$=the fraction of outdoor air 20 in the system supply $= V_{on}/V_{st}$ $V_{on}$=sum of outdoor airflow rates for all ductwork 26, 28 of the system 10

$Z$=the fraction of outdoor air 20 in the supply to the selected zone 14.

$= V_{oc}/V_{sc}$ $V_{oc}$=outdoor airflow rate required in the selected zone 14

$V_{sc}$=supply flow rate in the selected zone 14

To calculate the amount of ventilation air ($V_{ot}$) the air handler 12 needs to deliver to the system 10, the coordinating controller 60 needs the pertinent flow data from its coordinated controllers 34.

During the course of operation, the coordinating controller 60 reads or has read the following information from each of the coordinated controllers 34:

Measured airflow.
Effective ventilation setpoint.
Ventilation ratio.

The coordinating controller 60 writes the following information to the coordinated controllers 34:

Ventilation ratio limit.

Ventilation optimization uses the following user defined setpoints:

Y Limit. The coordinating controller 60 will ensure that the system ratio of ventilation airflow to supply airflow does not exceed a certain percentage.

Reset Interval. The reset interval indicates how often (in minutes) $V_{ot}$ is recalculated. The reset interval will depend on actual system dynamics, but to ensure system stability the coordinating controller 60 restricts the user from entering a value less than 5 minutes.

Ventilation optimization provides feedback on the following:

Effective ventilation airflow setpoint for the system, $V_{to}$.

Sum of outdoor airflow rates for all branches on the system, $V_{on}$.

Critical ventilation ratio, Z.

Total supply flow rate, $V_{st}$ (i.e. the sum of all supply airflow for all damper 21 of the system.

Which zone is the critical one.

Reset timer. The reset timer indicates how long it will be until $V_{ot}$ is recalculated.

Returning to FIG. 3, after the percentage of outside air in the total flow is calculated at step 210, step 212 is then implemented.

At step 212, the dynamic ventilation ratio limit from the coordinating controller 60 is tested to be present and valid. If the limit is either not present or invalid, then step 214 is executed. At step 214 the outside air limit is set as 100% to thereby assume that 100% outside air is possible in the supply air system.

If step 212 determined that the dynamic ventilation ratio limit was both present and valid, then step 216 is executed. At step 216, the local ventilation ratio is compared to the dynamic ventilation ratio limit. If the local ventilation ratio is larger than the dynamic ventilation ratio limit, then step 218 is executed where the local ventilation ratio is set equal to the dynamic ventilation ratio limit.

Step 220 indicates that the separate decision making possibilities in steps 214, 216 and 218 all rejoin at step 220.

From step 220, step 222 is executed where the minimum flow required for ventilation is calculated, and the active minimum is verified to be the greatest than the mode minimum and the ventilation minimum. The ventilation minimum is allowed to be increased until the zone temperature falls below thermostatic conditions, and the ventilation minimum can continue to increase if the zone rises above a second thermostatic point. All communicated data is sent to the coordinating controller 60.

During some conditions, the amount of outside air 20 introduced into the system 10 may be limited by a variety of factors, one of those factors being constraints on energy consumption. In such case, there may not be sufficient outside air 20 being introduced into the system 10 to properly ventilate one or more of the zones 14, and more total airflow may be needed by these zones 14 to meet their outside air requirements. The zone controller 34 includes a method of delivering additional air to meet ventilation requirements during these times, subject to the thermal constraints imposed by the zone controller 34, since temperature control and ventilation control are inherently at odds with each other.

To deliver additional air for the purpose of ventilation, the zone controller 34 calculates a minimum flow setpoint that is necessary to properly ventilate the zone 14. If the result of the ventilation minimum flow rate calculation is larger than the zone controllers mode minimum, the ventilation minimum flow becomes the zone controller's active minimum flow rate.

The ventilation minimum flow calculation is performed on a continuous basis, so that when requirements, conditions, or outside air limits change, the ventilation minimum flow will adjust itself up or down accordingly. The ventilation minimum flow can be increased to provide proper ventilation until the temperature of the zone 14 reaches a thermostat trip point, preferably a temperature setpoint set by a user to indicate a desired temperature for the zone 14. At this thermostatic trip point, the zone temperature is deemed out of control and the ventilation minimum flow will stop increasing. In such a scenario, minimum fresh air requirements for the zone 14 are unlikely to be met, control of the zone temperature is regained when a higher thermostat trip point is reached. At this point, if the ventilation requirements for the zone 14 are still not met, the ventilation minimum flow can resume ramping up.

In summary, the present invention provides robust means to properly ventilate each zone 14 in an HVAC system 10, regardless of the amount of outside air that is being introduced into that system 10. The present invention will support a variety of ventilation applications by allowing a user to change the configuration of or provide dynamic inputs to a zone controller 34. By allowing system level actions as well as zone level actions, and allowing the automatic configuration of the zone controllers in response to the available data and in spite of system control strategies disseminated by a coordinating controller 60, the operation of the HVAC ventilation system 10 can be optimized to provide zone temperature control and proper ventilation while simultaneously reducing energy consumption.

It will be apparent to a person of ordinary skill in the art that many changes and alterations are evident in this preferred embodiment of the present invention. All such alterations and modifications are contemplated to fall within the spirit and scope of the appended claims.

What is desired to be secured for Letters Patent of the United States is set forth in the following claims.

What is claimed is:

1. A method of selecting a ventilation control strategy from among a plurality of ventilation control strategies, the method comprising the steps of:
   determining if a $CO_2$ signal is present and valid;
   selecting a $CO_2$ based ventilation control strategy if the $CO_2$ signal is present and valid;
   selecting a second ventilation control strategy if the $CO_2$ signal is not present or is invalid; and
   operating using the selected strategy;
   wherein the selection occurs in a zone controller.

2. The method of claim 1 wherein the step of selecting a second control strategy includes the steps of determining if a dynamic setpoint signal is present and valid, selecting a dynamic setpoint control strategy if the dynamic setpoint signal is both present and valid; and
   selecting a third ventilation control strategy if the dynamic setpoint signal is not present or is invalid.

3. The method of claim 2 wherein selecting a third ventilation control strategy step includes the further steps of:
   determining if an indicia of occupancy is both present and valid; operating in an occupancy based ventilation control strategy if the indicia of occupant is both present and is valid; and
   operating using a static rate ventilation if the indicia of occupancy is either not present or is invalid.

4. The method of claim 3 wherein the calculations for the dynamic setpoint and for occupancy are undertaken in a coordinating controller and downloaded into the zone controller for use.

5. The method of claim 4 wherein the determinations of the control strategy to be implemented are made in the zone controller.

6. The method of claim 5 including the further steps of maintaining time of day information in the coordinating controller and downloading time of day information to the zone controllers either periodically or upon a change of state or condition.

7. A method of coordinating operation in a building control system including a coordinating controller, a plurality of coordinated controllers, and a communications network operably connecting the coordinating controller to the plurality of coordinated controllers, the method comprising the steps of:
   maintaining database and system information in the coordinating controller;
   completing system control strategy calculations in the coordinating controller;
   disseminating information relative to system control strategies from the coordinating controller to the plurality of coordinated controllers; and
   determining in at least one of the plurality of coordinated controllers which of a selected group of control strategies to be implemented in that coordinated controller.

8. The method of claim 7 wherein each coordinated controller makes an independent determination as to which of the multiplicity of control strategies to implement.

9. The method of claim 8 wherein the multiplicity of control strategies include a $CO_2$ based ventilation control strategy, a dynamic setpoint control strategy and a static rate ventilation control strategy.

10. A method of coordinating the operation of a building control system having a coordinating controller and a plurality of coordinated controllers, the method comprising the steps of:
    determining at least one system wide control strategy in the coordinating controller;
    forwarding requirements of the system wide control strategy to one or more of a plurality of coordinated controllers;
    implementing one or more forwarded elements of the system wide control strategy in at least one of the plurality of coordinating controllers; and
    overriding, in at least one of the plurality of coordinated controllers, at least one forwarded element of the system wide control strategy.

11. The method of claim 10 wherein the overriding step includes the step of implementing a different control strategy.

12. The method of claim 11 wherein each of the plurality of coordinated controllers makes its own determination of which control strategy to implement.

13. The method of claim 12 wherein the system wide control strategy includes the further steps of calculating and determining a dynamic setpoint relative to a dynamic setpoint control strategy.

14. The method of claim 13 wherein the coordinated controller selects from at least the control strategies of a $CO_2$ based ventilation control strategy, a dynamic setpoint control strategy and a static rate ventilation control strategy.

15. The method of claim 14 wherein the selection of control strategies includes an occupancy based control strategy.

16. A method of coordinating the operation of a building control system including a coordinating controller and a plurality of coordinated controllers, the method comprising the steps of:
providing a plurality of coordinated controllers;
providing a coordinating controller operably connected to and communicating with the plurality of coordinated controllers;
determining a system wide control strategy in the coordinating controller;
communicating elements of the system wide control strategy to the plurality of coordinated controllers;
determining local requirements in at least one of the plurality of coordinated controllers; and
overriding the normal control routines of the coordinating controller if said at least one of the plurality of coordinated controllers determines that local requirements will not be met by the system wide strategy.

17. The method of claim 16 wherein the overriding steps includes the step of implementing a different control strategy.

18. The method of claim 17 wherein each of the plurality of coordinated controllers makes its own determination of which control strategy to implement.

19. The method of claim 18 wherein the system wide control strategy includes the further steps of calculating and determining a dynamic setpoint relative to a dynamic setpoint control strategy.

20. The method of claim 19 wherein the coordinated controller selects from at least the control strategies of a $CO_2$ based ventilation control strategy, a dynamic setpoint control strategy and a static rate ventilation control strategy.

21. The method of claim 20 wherein the selection of control strategies includes an occupancy based control strategy.

22. A method of calculating an outside air requirement for a zone, the method comprising the steps of:
determining that ventilation is on for the particular zone;
verifying that a $CO_2$ signal is present and valid for the particular zone;
controlling the airflow to the zone based on the $CO_2$ signal if the signal is present and valid; and
controlling the airflow to the zone based on another criteria if the $CO_2$ signal is not present or is invalid.

23. The method of claim 22 wherein the other control criteria determines if a dynamic rate is available from an external source and controls the airflow to the particular zone based on the dynamic rate if the dynamic rate is available.

24. The method of claim 23 including the further steps of controlling the airflow to the particular zone based on an occupied setpoint if the dynamic rate signal is not available and the $CO_2$ signal is not available or invalid.

25. The method of claim 24 including the further step of modulating the airflow to the zone based on a standby setpoint if the dynamic rate input is not available and the $CO_2$ rate signal is invalid or not present and the user has set a standby status.

26. The method of claim 22 wherein controlling the airflow through the zone based upon the $CO_2$ signal step includes the further steps of determining the available amount of outside air present in a supply airflow and overriding temperature control to provide more fresh air if the amount of fresh air present in the airflow is insufficient to meet the outside air requirement.

27. The method of claim 26 including the further step of calculating the amount of outside air required for a particular zone.

28. The method of claim 26 including the further step of determining absolute limits on which the temperature control signal will not be overridden.

29. A method of meeting fresh air temperature requirements in a zone, the method comprising the steps of:
determining a zone temperature setpoint and absolute limit requirements;
determining a zone fresh air requirement;
determining the percentage of fresh air in a supply airstream;
determining if the percentage of fresh air in the supply airstream is enough to meet the zone fresh air requirement; and
increasing the amount of supply airstream flow admitted to the zone if the percentage of fresh air in the supply airstream is insufficient to meet the zone's fresh air requirement.

30. The method of claim 29 including the further step of terminating the increase in supply air flow when absolute temperature limit is exceeded.

31. A method of configuring a zone controller comprising the steps of:
determining if a valid $CO_2$ measurement is available representative of $CO_2$ in a zone being controlled by the zone controller;
operating using a $CO_2$ based ventilation control strategy if the $CO_2$ signal is available; and
operating using a non-$CO_2$ based ventilation control strategy if the $CO_2$ signal is not available.

32. The method of claim 31 wherein the non-$CO_2$ based ventilation control strategy is a static rate ventilation control strategy.

33. The method of claim 31 including the further step of receiving instructions from a coordinating controller to implement a system wide control strategy.

34. The method of claim 33 including the further steps of overriding the instructions and implementing a different control strategy.

35. The method of claim 34 wherein the system wide control strategy includes the further steps of calculating and determining a dynamic setpoint relative to a dynamic setpoint control strategy.

36. The method of claim 35 wherein the zone controller selects from at least the control strategies of a $CO_2$ based ventilation control strategy, a dynamic setpoint control strategy and a static rate ventilation control strategy.

37. The method of claim 36 wherein the selection of control strategies includes an occupancy based control strategy.

38. A method of providing fresh air to a zone, the method comprising the steps of:
 determining a local setpoint relative to a zone controller;
 receiving, in the zone controller, a dynamic setpoint from a coordinating controller;
 selecting, in the zone controller, either the dynamic setpoint or the local setpoint; and
 controlling the fresh air provided to the zone in accordance with the selected setpoint.

39. The method of claim 38 including the further step of adjusting the selected setpoint to meet fresh air requirements for the zone.

* * * * *